UNITED STATES PATENT OFFICE.

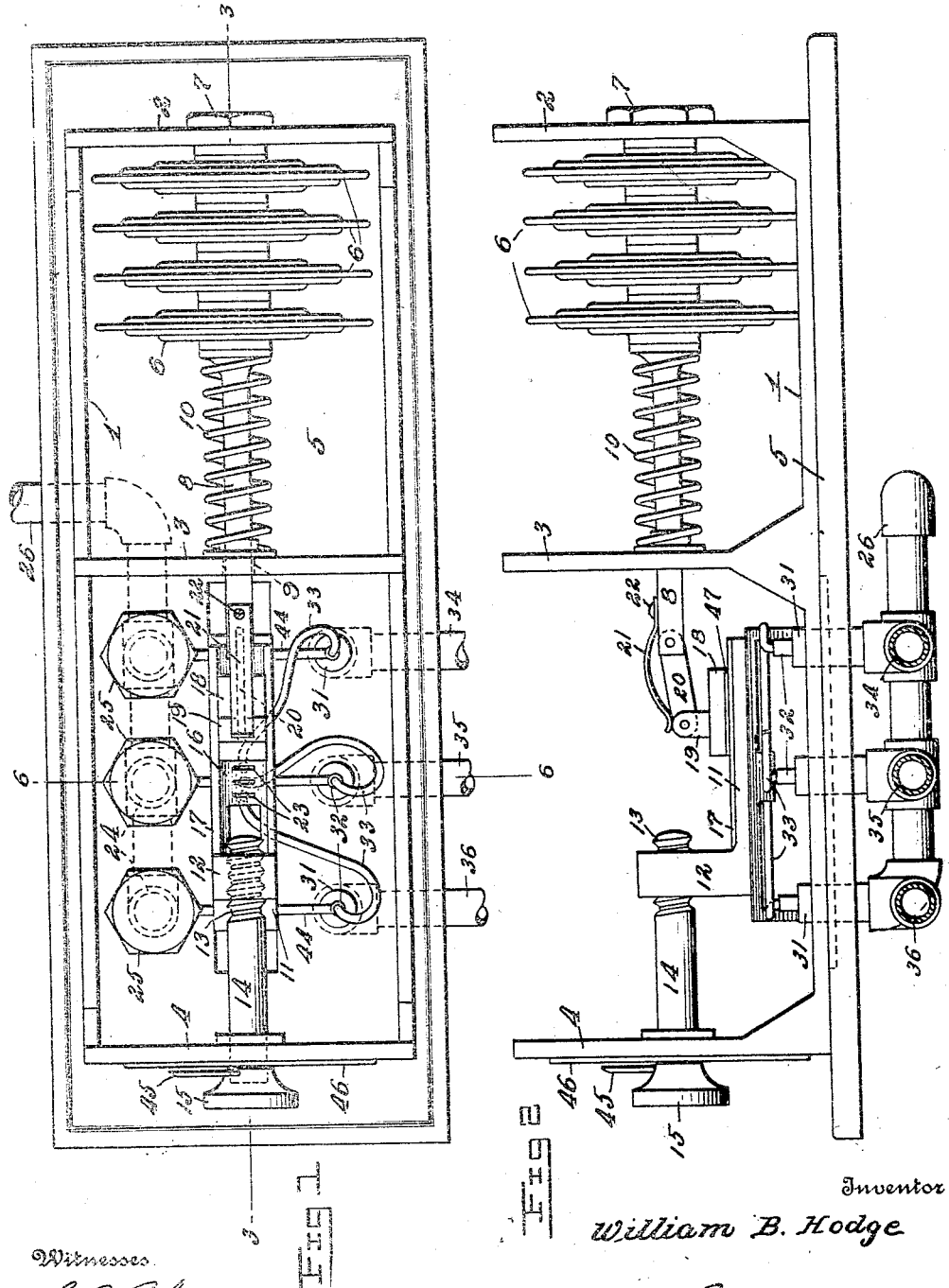

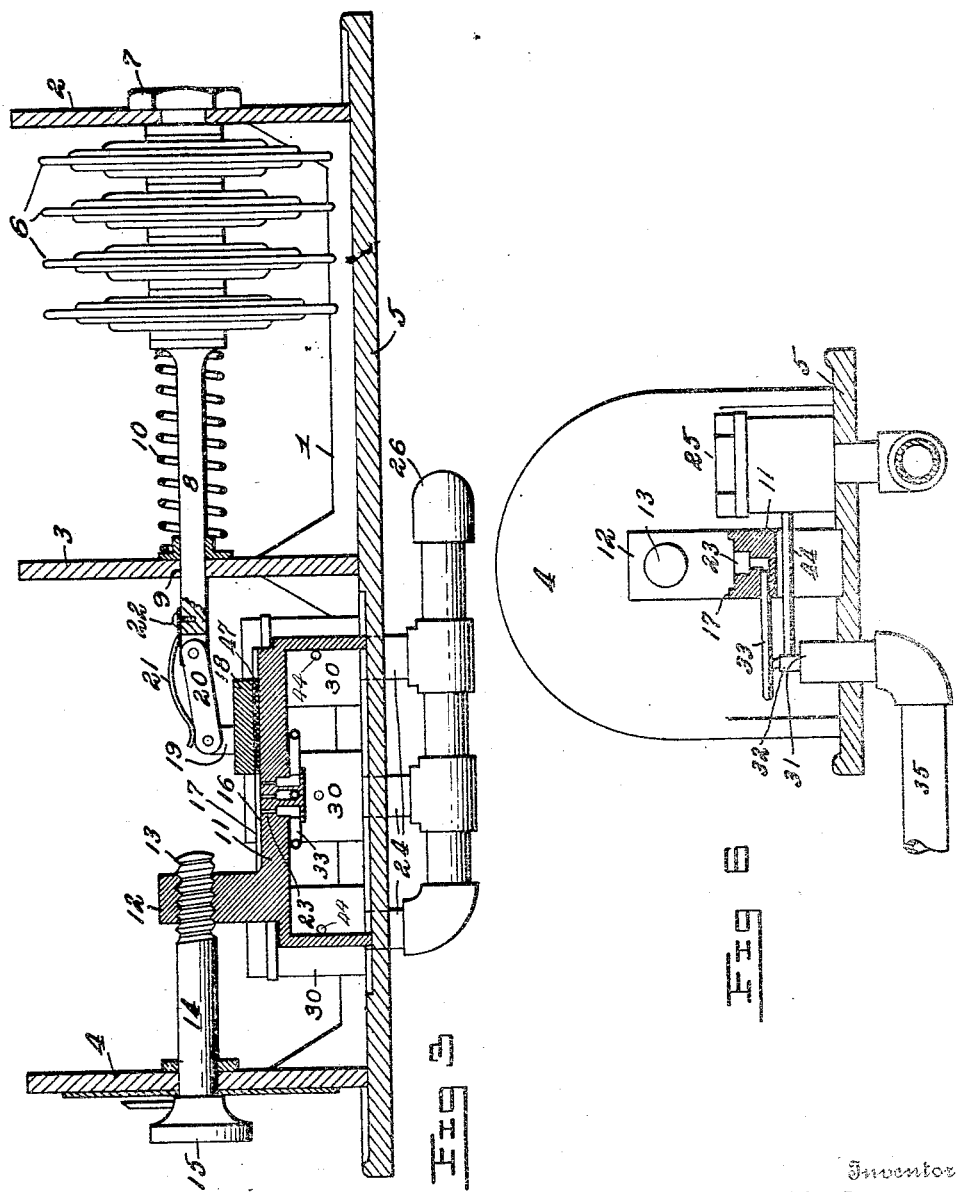

WILLIAM B. HODGE, OF CHARLOTTE, NORTH CAROLINA, ASSIGNOR, BY MESNE ASSIGNMENTS, TO PARKS-CRAMER COMPANY, OF FITCHBURG, MASSACHUSETTS, A CORPORATION OF MASSACHUSETTS.

HYGROSTATIC OR THERMOSTATIC CONTROL DEVICE FOR AIR-CONDITIONING SYSTEMS.

1,284,335.   Specification of Letters Patent.   Patented Nov. 12, 1918.

Application filed February 1, 1915. Serial No. 5,537.

*To all whom it may concern:*

Be it known that I, WILLIAM B. HODGE, a citizen of the United States, residing at Charlotte, in the county of Mecklenburg and State of North Carolina, have invented certain new and useful Improvements in Hygrostatic or Thermostatic Control Devices for Air-Conditioning Systems; and I do hereby declare the following to be a full, clear, and exact description of the invention, such as will enable others skilled in the art to which it appertains to make and use the same.

The invention relates to improvements in hygrostatic or thermostatic means or devices for controlling the temperature or humidity of air conditioning systems.

In heating or humidifying a building, it is well known practice to divide the heating section into a series of auxiliary sections or stacks, and to control the temperature of the air by providing each auxiliary section or stack with independent means for turning on and off the steam therefrom to secure the desired temperatures, and in the same way, it has been found to be good practice to divide the humidifying section or nozzles into a series of banks each provided with independent means for putting into or out of operation more or less of these nozzles to saturate the air to a greater or less degree.

An object of the invention is to control the different sections of either of the heating section or the humidifying section automatically and in consecutive order, by means of a single hygrostatic or thermostatic device operating progressively to cut in or out as many of such sections as may be desired.

Another object of the invention is to provide each of the auxiliary sections of either of the heating section or the humidifying section, or both, with diaphragm valves connected to a main control valve, the latter having a number of ports corresponding to the number of such valves and sections controlled thereby, and a single hygrostatic or thermostatic device operating, at predetermined degrees of humidity or temperature, to progressively open or close the ports of the main control valve for the actuation of the diaphragm valves of each auxiliary section.

With these and other objects in view, the invention resides in certain novel constructions and arrangements as will be hereinafter more fully described, set forth in the appended claims, and illustrated in the accompanying drawings, in which:—

Figure 1 is a top plan view of the preferred embodiment of the invention,

Fig. 2 is a side elevation of the same,

Fig. 3 is a vertical longitudinal section on the line 3—3 of Fig. 1,

Fig. 6 is a vertical transverse section on the line 6—6 of Fig. 1.

Figure 4:
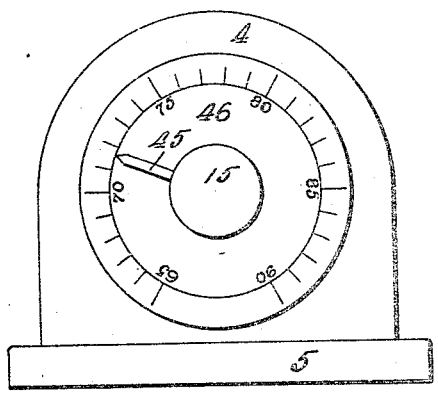
Fig. 4 is an end view showing the indicator for setting the device for operation at predetermined degrees of temperature or humidity.

Referring to the accompanying drawing, in which like characters of reference designate corresponding parts in the several views thereof, 1 designates a suitable supporting frame having spaced vertically disposed walls or plates 2, 3, and 4 rising therefrom, and is provided with a supporting plate 5 extending the length of the supporting frame.

A series of diaphragms 6 are arranged in advance of the wall or plate 2 and is secured thereto, at one end, by a screw 7, while the free end of the same is provided with an extension rod 8 which is projected through a guide opening 9 formed centrally of the wall or plate 3. A coiled spring 10 is carried by the extension rod 8 and is interposed between the free end of the diaphragms 6 and the opposed face of wall or plate 3.

A valve block 11 is arranged on the longitudinal center of the supporting plate 5 and is provided with an upwardly extending ear or lug 12 having a threaded opening for the reception of the threaded end 13 of the rod 14 which is supported in a centrally disposed opening formed in the wall or plate 4 and terminates, on the opposite side thereof, in a milled head 15 by means of which the rod 14 may be turned for the adjustment of the valve block 11 along the surface of the supporting plate 5, aforementioned. The valve block 11 is formed with a milled upper face 16 and oppositely disposed guide flanges 17 to provide a runway for a slide valve 18 having an upwardly projected ear or lug 19 pivotally connected, by means of a link 20, to the free end of the extension rod 8. A spring 21 is secured to the free end of the extension rod 8, by means of a screw 22, and is adapted to bear upon the ear or lug 19 so as to hold the slide valve 18 firmly upon the milled face 16 of the valve block.

The valve block 11 is provided with a plurality of ports 23, three of such ports only being shown for obvious reasons, the purpose of which will be hereinafter described.

Figure 5:
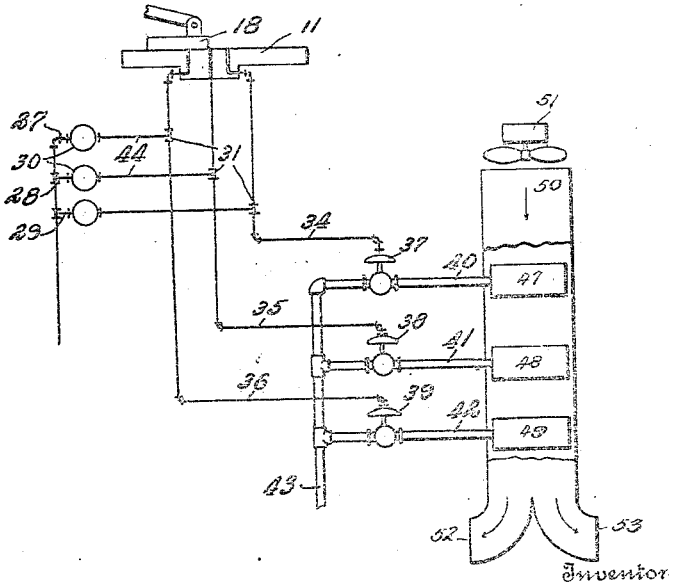
Fig. 5 is a diagrammatic plan view of an air conditioning system showing the invention applied thereto.

Projecting through the supporting plate 5, at one side of the valve block 11, is a series of pipe fittings 24 (corresponding in number to the number of ports formed in the retarding valves 30) which are capped by means of the nuts 25 and form the terminals of an air pressure line 26, Fig. 1, or the individual air pressure lines 27, 28, and 29 shown in Fig. 5, which air pressure lines are, preferably, provided with suitable retarding valves 30. Projecting upwardly through the supporting plate 5, on the opposite side of the valve block 11 to that occupied by pipe fittings 24, are a second series of pipe fittings 31, also corresponding in number to that of the number of ports formed in the valve block, provided with reduced extensions 32 which are connected with ports 23 by means of the resilient coupling members 33. These pipe fittings 31 form the terminals of branch air pressure pipe connections 34, 35, and 36, which lead to and connect each with a diaphragm valve 37, 38, and 39 located in the branches 40, 41, and 42 of a steam pressure line 43. The pipe fittings 24 are connected, by means of suitable branch connections 44, each to a corresponding pipe fitting 31.

These steam branches 40, 41 and 42 connect respectively to radiation coils 47, 48 and 49, provided with a suitable casing 50, and over which a draft of air can be forced by means of a suitable fan 51, in the direction of the arrow; outlets 52 and 53 can be arranged in any convenient manner to conduct to the desired locations.

Carried by the rod 14 and arranged immediately adjacent the milled head 15, is an indicator arm or pointer 45 which is adapted to be moved over a plate 46 secured to the outer face of the wall or plate 4, when a turning movement is imparted to the said rod. This plate 46 is provided with a scale laid off into degrees of humidity or temperature, preferably the latter in the present case.

The operation of the device is as follows: Assuming a fixed position of the valve block 11, such fixed position being determined by setting the indicator for a desired temperature, changes in temperature above or below that of the predetermined point cause a corresponding expansion or contraction of the diaphragms 6 and movement of the extension rod 8 so that the slide valve is moved forward and backward along the valve block 11 and consequently closing and opening the ports 23. With the diaphragm valves 37, 38 and 39 normally open, and also the ports 23 of the valve block 11, an abnormal rise in temperature causes an expansion of the diaphragms 6 and a forward movement of the slide valve 18 which will, first, cover the adjacent port, the closing of which permits the air pressure to actuate the diaphragm valve 37, connected to the air pressure pipe 34, and located in the branch 40 of the steam pressure line 43, thus closing the valve and cutting off the steam from the bank or stack of the system thus controlled. A further expansion of the diaphragm 6 causes a corresponding movement of the slide valve 18 to close the second and third ports which will admit of the actuation of the diaphragm valves 38 and 39, as above noted in connection with the diaphragm valve 37.

The slide valve 18 is provided, preferably, with a plate of glass 47 on its under or valve block contacting face so as to present an extremely hard, tight fitting, surface therebetween, and one in which the usual corroding of metal surfaces is practically eliminated, the outer casing, preferably perforated over the diaphragms but tight over the valve, for inclosing the device and protecting the valve section, yet allowing a ventilation across the diaphragm.

It is to be noted that the valve block 11 may be advanced or set farther ahead than shown, so that the ports 23 can be opened in succession as the temperature rises, rather than closed, as in the present instance.

From the foregoing, it will be observed that the invention provides for a more gradual control of temperature throughout the entire system by means of a single thermoresponsive device than is obtained in those systems utilizing such similar devices corresponding in number to that of the number of branches of either of the heating or water lines to be controlled.

It is also well understood practice in this art that electrical contacts with their connections to valves and current supply form a means of actuating valves equivalent to and interchangeable with the pneumatic means shown and described herein, and it is not desired to limit this application to merely means of pneumatic control, but to also include the well-known electrical means or any other means equivalent to the pneumatic.

One of the principal advantages of this arrangement of thermostatic valve is in the fact that the progressive actuations are direct and independent of the pressure of the fluid operating the diaphragm valves, 37—38 and 39; but at all times this fluid pressure is substantially constant and equal both in the thermostat itself and on each diaphragm valve, and any reduction or increase of this fluid (within working limits) in no manner affects the operation of the system.

Having thus fully described the invention, what I claim, is:—

1. In combination, in an air conditioning system, a heating line provided with a plurality of branches, pressure actuated devices for putting into or out of operation said branches, and a single means for progressively diverting fluid of substantially constant pressure direct to said pressure actuated devices.

2. In combination, in an air conditioning system a heating line provided with a plurality of banks or sections, a diaphragm valve arranged in each of said banks or sections, directly connected and substantially constant fluid pressure means for actuating said diaphragm valves, and a single means for controlling said fluid pressure means progressively.

3. In combination, in an air conditioning system a heating line provided with a plurality of banks or sections, a diaphragm valve arranged in each of said banks or sections, substantially constant fluid pressure means for actuating said diaphragm valves, a multiple control valve for diverting said fluid pressure to said diaphragm valves, and means for actuating said control valve.

4. In combination, in an air conditioning system a heating line provided with a plurality of banks or sections, a diaphragm valve arranged in each of said banks or sections, a main fluid pressure line, a plurality of branch fluid pressure lines connecting said main fluid pressure line with said diaphragm valves, a thermostatically operated valve for diverting said main fluid pressure to said branch pressure lines serially and progressively.

5. In combination, in an air conditioning system a heating line provided with a plurality of banks or sections, a diaphragm valve arranged in each of said banks or sections, a main fluid pressure line, a plurality of branch fluid pressure lines, and a multiport slide valve for diverting said main fluid pressure to said branch fluid pressure lines.

6. In combination, in an air conditioning system a heating line provided with a plurality of banks or sections, a diaphragm valve arranged in each of said banks or sections, a main fluid pressure line, a plurality of branch fluid pressure lines connecting said main fluid pressure line with said diaphragm valves, a valve seat provided with a plurality of ports, a valve for controlling said ports, flexible couplings connecting said branch fluid pressure lines, with said ports, and a thermostatic device for progressively actuating said valve to control said ports.

7. In combination, in an air conditioning system a heating line provided with a plurality of banks or sections, a diaphragm valve arranged in each of said banks or sections, a main fluid pressure line, a plurality of branch fluid pressure lines connecting said main fluid pressure line with said diaphragm valves, a valve block provided with a plurality of ports, flexible couplings connecting said branch fluid pressure lines with said ports in said valve block, a slide valve for said valve block, and means for moving said valve block and said slide valve relative to one another.

8. The combination in a thermo-responsive device of a main pressure supply and a series of valve ports connected thereto, with means for opening or closing said valve ports progressively with changes in temperature.

9. In a thermostat, a valve block provided with a plurality of ports, a thermo-responsive device for opening or closing the ports of said valve progressively, and direct connections whereby constant fluid pressure is maintained in each port.

10. In a thermostat, a valve block provided with a plurality of ports, a slide valve for said valve block, and a thermo-responsive device for actuating said slide valve whereby the ports of said valve block are progressively opened and closed.

11. In a thermostat, a valve block provided with a plurality of ports, a slide valve for said block, means for adjusting said valve block relative to said slide valve, and a thermo-responsive device for actuating said slide valve whereby the ports of the latter are progressively opened and closed.

12. In a thermostat, a valve block provided with a plurality of ports, a slide valve for said valve block, means for adjusting said valve block relative to said slide valve, means for setting said adjusting means for operation at predetermined degrees of temperature, and a thermo-responsive device for actuating said slide valve relative to said valve block whereby the ports of the latter are progressively opened and closed.

13. In a thermostat, a thermo-responsive member for moving a slide valve with temperature changes, a pressure supply connected to a series of ports over which said slide valve moves, and branch connections to said ports whereby the closing of any port accumulates pressure in its branch connection substantially constant with that in the main pressure supply.

14. In a thermostat, a thermo-responsive member for moving a slide valve, a main line for constant fluid pressure supply and branch supply lines leading to pressure actuating valves, a series of ports arranged to be progressively covered by said slide valve, and connection between the main supply line to said branch supply lines whereby said fluid pressure is allowed to accumulate in the branch connections to assume the same
5 pressure as that of the main supply, dependent upon the position of said slide valve.

In testimony whereof I affix my signature in presence of two witnesses.

WILLIAM B. HODGE.

Witnesses:
  JNO. C. WATSON,
  HOWARD MORRISON.